(12) United States Patent
Ohashi et al.

(10) Patent No.: US 6,477,761 B1
(45) Date of Patent: *Nov. 12, 2002

(54) PRODUCTION METHOD FOR AN AC GENERATOR STATOR CORE FOR A VEHICLE

(75) Inventors: Atsushi Ohashi; Yoshihito Asao; Toshiaki Kashihara; Kyoko Higashino; Katsumi Adachi, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 156 days.

This patent is subject to a terminal disclaimer.

(21) Appl. No.: 09/630,393

(22) Filed: Aug. 1, 2000

Related U.S. Application Data

(62) Division of application No. 09/404,996, filed on Sep. 27, 1999, now Pat. No. 6,262,511.

(30) Foreign Application Priority Data

Apr. 1, 1999 (JP) ............................................. 11-095354

(51) Int. Cl.⁷ .............................................. H02K 15/00
(52) U.S. Cl. .......................................... 29/596; 228/190
(58) Field of Search ......................... 29/596, 598, 901; 228/190; 310/216, 217, 254, 258

(56) References Cited

U.S. PATENT DOCUMENTS

| | | | |
|---|---|---|---|
| 3,156,840 A | | 11/1964 | Clothier et al. .............. 310/254 |
| 4,687,960 A | | 8/1987 | Frister .......................... 310/42 |
| 5,698,925 A | | 12/1997 | Coupart ....................... 310/217 |
| 5,875,540 A | | 3/1999 | Sargeant et al. ............. 310/216 |
| 6,002,191 A | * | 12/1999 | Saban .......................... 310/216 |
| 6,246,142 B1 | * | 6/2001 | Asao et al. .................. 310/217 |
| 2001/0017500 A1 | * | 8/2001 | Hirama et al. ............... 310/217 |

FOREIGN PATENT DOCUMENTS

| | | |
|---|---|---|
| GB | 366492 | 8/1930 |
| GB | 754430 | 6/1954 |
| GB | 2312332 | 10/1997 |
| JP | 53-141410 | 12/1978 |

* cited by examiner

Primary Examiner—S. Thomas Hughes
Assistant Examiner—Stephen Kenny
(74) Attorney, Agent, or Firm—Sughrue Mion, PLLC

(57) ABSTRACT

A thin metal sheet is laminated to form in advance a plurality of core units (of a circular cylinder shape) having the thickness of 1/N (N is a natural number of more than 2) of a predetermined thickness in the laminating direction and this plurality of core units is laminated again for securing so that the whole stator does not cause any mode of oscillation in the diametric direction.

2 Claims, 21 Drawing Sheets

US 6,477,761 B1

PRODUCTION METHOD FOR AN AC GENERATOR STATOR CORE FOR A VEHICLE

This is a divisional of application Ser. No. 09/404,996 filed Sep. 27, 1999 and now U.S. Pat. No. 6,262,511, the disclosure of which is incorporated herein by reference.

BACKGROUND OF THE INVENTION

1. Field of the Invention

The present invention relates to an AC generator stator core to be mounted on a vehicle and a method for producing the AC generator stator core.

2. Description of the Prior Art

FIG. 13 is a sectional view of a conventional AC generator for a vehicle. This AC generator comprises a casing 3 consisting of a front bracket 1 and a rear bracket 2 which are connected together by a bolt 3B, a shaft 5 securing at one end thereof a pulley 4 which receives a turning force transmitted from an engine through a belt, a rotor 6 of Lundell type secured to the shaft 5, fans 6F secured to both sides of the rotor, a stator 7A secured to the inner wall surface within the casing 3, a slip ring 8 secured to the other end of the shaft 5 to supply the rotor 6 with an electric current, a pair of brushes 9 and 9 sliding on the slip ring 8, a brush holder 10 housing the brushes 9 and 9, a rectifier 11 electrically connected to the stator 7A to rectify an alternating current generated at the stator 7A to a direct current, a heat sink 12 attached to the brush holder 10, and a regulator 13 adhering to the heat sink 12 to regulate the size of the AC voltage generated at the stator 7A. Reference numerals 14a and 14b are bearings and numeral 15 is a bracket for attaching the AC generator to an engine.

Said rotor 6 is provided with a rotor coil 6A generating magnetic flux from the flow of an electric current, and a field core 6B arranged to cover a rotor coil 6A and forming magnetic pole therein by the magnetic flux of the rotor coil 6A. The field core 6B consists of a pair of mutually engaged field core bodies 6x and 6y. The field core bodies 6x and 6y are made of steel, each having a claw-shaped magnetic pole 62.

Said stator 7A is provided with a stator core 17A, and a stator coil 17B composed of conductor wires wound around the stator core 17A. The stator coil 17B generates an alternating current by the change of the magnetic flux from the rotor coil 6A in accordance with the rotation of the rotor 6.

In the above-mentioned AC generator for a vehicle, an electric current is supplied to the rotor coil 6A through the brushes 9 and 9 and the slip ring 8 from a battery (not shown) to generate magnetic flux, while the pulley 4 is driven by the engine to rotate the shaft 5 and the rotor 6, wherein the stator coil 17B is given a rotating magnetic field to cause an electromotive force therein. This electromotive force is rectified through diodes 16, 16 of the rectifier 11 to a direct current and the regulator 13 then regulates the size of the direct current to be charged to a battery.

FIG. 14 is a sectional view of a conventional brushless AC generator for a vehicle. In FIG. 14, the reference numerals shown represent the same or corresponding elements shown in FIG. 13 therefore their descriptions will be omitted. In this brushless AC generator for the vehicle, when the engine is started, an exciting current from the battery is supplied through the regulator 13A to an exciting coil housed in an exciting core 19 and the rotation of the shaft 5 allows the field core bodies 6x and 6y of the rotor 6 to rotate to generate the electromotive force at the stator coil 17B of the stator 7A. This AC electromotive force is rectified through the diodes 16 and 16 of the rectifier 11 to the direct current and the current size is then regulated by the regulator 13A and charged to the battery.

FIG. 15 is a simplified perspective view showing one example of a stator core 17A which is used in a conventional vehicle AC generator as shown in FIGS. 13 and 14. As shown in FIG. 16, the stator core 17A is formed to have a circular cylinder body by spirally laminating a long, thin metal sheet 17a (made of steel) which is formed by stamping and then several places on the outer periphery of the circular cylinder body is welded to be extended in the laminating direction. Thus, the stator core 17A is completed to have a predetermined thickness S in the laminating direction. The thin metal sheet 17a is provided with a recess 17b forming a slot 20 after lamination and a recess 17c forming a bolt clearance groove 21. FIG. 17 is a schematic plan view of the stator core 17A.

In FIG. 15, there is shown one example in which four welding places are provided, on the outer periphery, at intervals of about 90° relative to a center of the circular cylinder body. Generally, there are provided four welding places from a core assembly strength point of view. Also, in case of welding., it is advisable to pick up the circular cylinder body first, by for example a chuck and the like to make each of the thin metal sheets 17a come closely into contact, and then weld the outer periphery of the circular cylinder body linearly from the top to bottom by using a jig that moves in a laminating direction of the circular cylinder body.

FIG. 15 shows the stator core 17A provided with slots 20. Each slot is wound by a one-phase coil, two-phase coil and three-phase coil, respectively to cause three-phase AC. FIG. 18 shows a completed stator core 7A. Each coil corresponding to one-phase is wound at intervals of two slots. Also, a conductor wire 17e forming the coil is secured within each slot 20 by varnish 22 as shown in FIG. 19 and the opening side of the slot 20 is also sealed by resin 23.

As shown in FIG. 16, the long, thin metal sheets 17a made by stamping are spirally laminated to provide a plurality of bolt clearance grooves 21 on the outer periphery of the stator core 17A. The grooves 21 are linearly formed to continue from the top to bottom in parallel relative to the laminating direction of the thin metal sheets 17a. These bolt clearance grooves 21 are, for example, provided at intervals of 10° relative to a circular center of the stator core 17A.

As described above, the circular cylinder body is formed by spirally laminating the long, thin metal sheets 17a. In addition to this example, it is also possible to assemble another stator core with a predetermined thickness by laminating a plurality of thin metal sheets (of thin plate ring shape) to form a circular cylinder body and then making several welds on the outer periphery in the same manner as above.

According to the conventional stator core 17A as described above, welds are linearly made to continue from the top to bottom on the circular cylinder body and in parallel in the laminating direction of the thin metal sheets (i.e. in parallel along the bolt clearance grooves 21). In this case, if an attraction force between the rotor 6 and the stator 7A is applied to the stator core 17A, there has been a problem whereby the linearly made welding location becomes a node and as shown in FIG. 20, the whole stator 7A causes the mode of oscillation in a diametric direction.

Also, as shown in FIG. 21, in a stator core 30 which is disclosed in Japanese Laid-Open Utility Model Publication (Kokai) No. Sho 53–141410, there is shown that a non-welding portion 31 is partially provided. Here are formed welds 32 that are continuous vertically at several welding locations on the outer periphery of a stator core 30 with a predetermined thickness S. However, in this case, since there are many welds 32 that are continuous vertically at each welding location, the welds 32 are not always made dispersely in the peripheral and vertical directions of the outer periphery of the stator core. Therefore, the welds 32 become the node and they do not serve to eliminate the role. Since there are various orders in the vehicle AC generator where the engine speed covers a wide range, there is still a problem that the welds come to serve as one of the nodes and still generate the mode of oscillation.

SUMMARY OF THE INVENTION

It is therefore an object of the present invention to solve the above-mentioned problems and to provide an improved stator core and a method for its production that make it hard to produce an oscillation node in a diametric direction and can decrease the mode of oscillation.

According to the present invention, there is provided a stator core of an AC generator comprising a plurality of first cylinder bodies each having a predetermined thickness of 1/N (where N is a natural number greater than 2), of a predetermined axial thickness of the stator core, wherein each first cylinder body is formed by laminating a plurality of thin metal sheets. A second circular cylinder body is formed by laminating the plurality of first cylinder bodies to have the axial predetermined thickness, wherein the pluralities of first cylinder bodies contribute as a plurality of core units in the second cylinder body, and wherein each of the plurality of thin metal sheets is fixedly secured by welding.

Further, the core units can be fixedly secured by welding on the outer or inner periphery of the second circular cylinder, and a peripheral welding location between two adjacent first cylinder bodies can be selected to be different from a welding location of the thin metal sheets of each of the first cylinder bodies. In addition, the welding locations of the thin metal sheets of the first cylinder bodies can be arranged to be discontinuous in the laminating direction of the thin metal sheets in at least one of the core units.

The stator core is produced by the steps of laminating the thin metal sheet to form in advance a plurality of core units of a circular cylinder shape with the thickness of 1/N (N is a natural number of more than 2) of a predetermined thickness in the laminating direction, laminating this plurality of core units to form a circular cylinder body with a predetermined thickness; and securing the core units to one another.

The above and other objects, features and advantages of the present invention will become more apparent from the following description when taken in conjunction with the accompanying drawings.

BRIEF DESCRIPTION OF THE ACCOMPANYING DRAWINGS

DETAILED DESCRIPTION OF THE PREFERRED EMBODIMENTS 1$^{st}$ Embodiment

Figure 15:
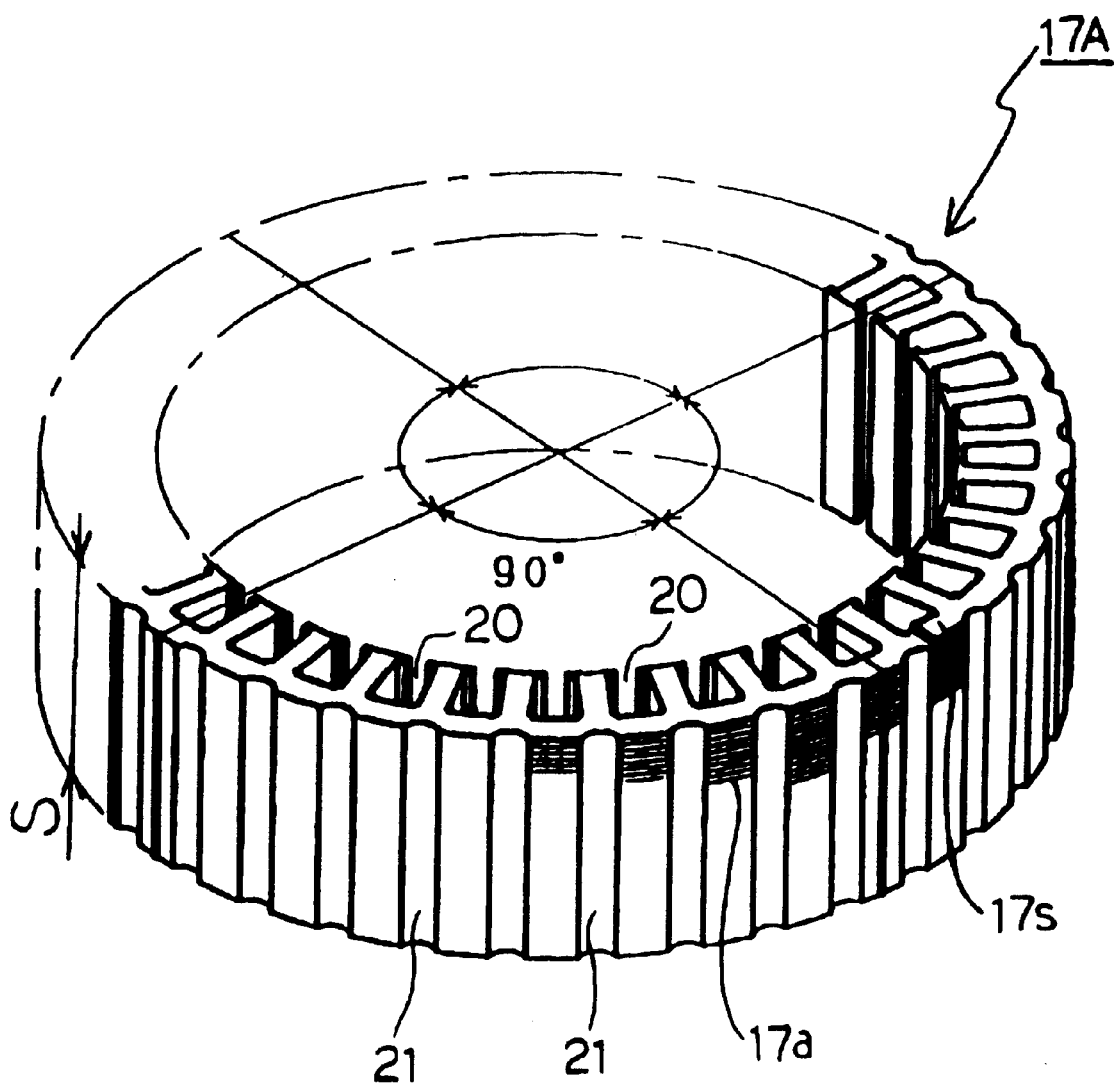
FIG. 15 is a schematic perspective view showing one example of a conventional stator core.
Figure 16:
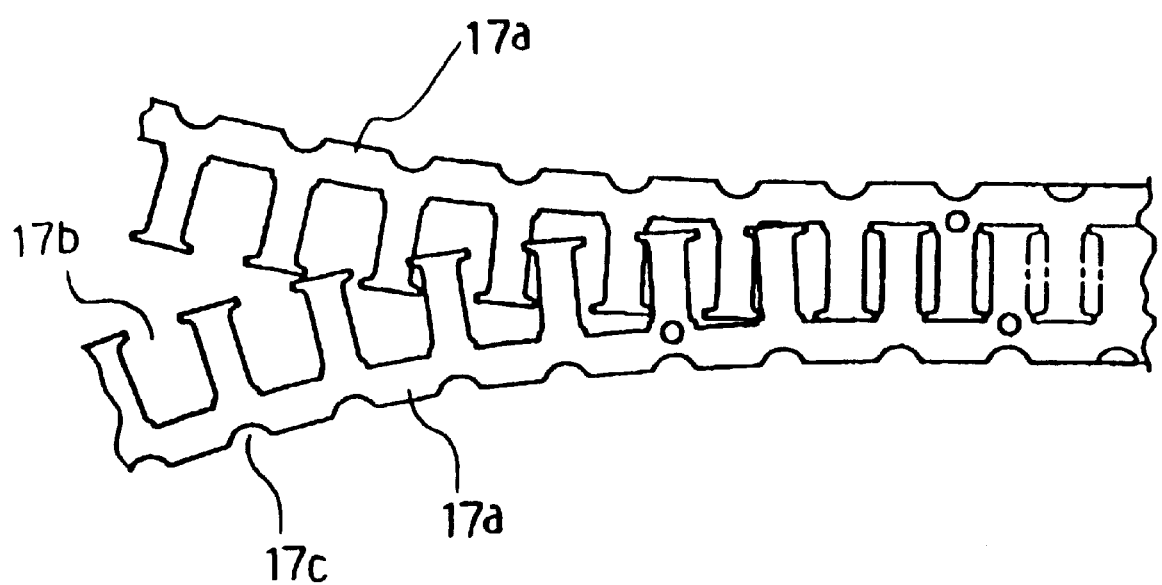
FIG. 16 is a view explaining a thin metal sheet forming a conventional stator core.
Figure 17:
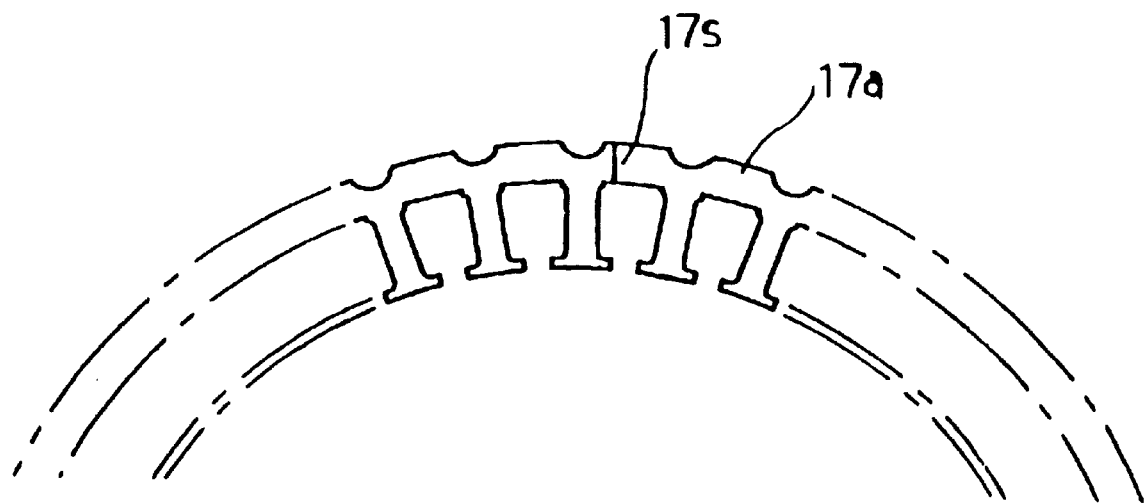
FIG. 17 is a schematic plan view of a conventional stator core.
Figure 18:
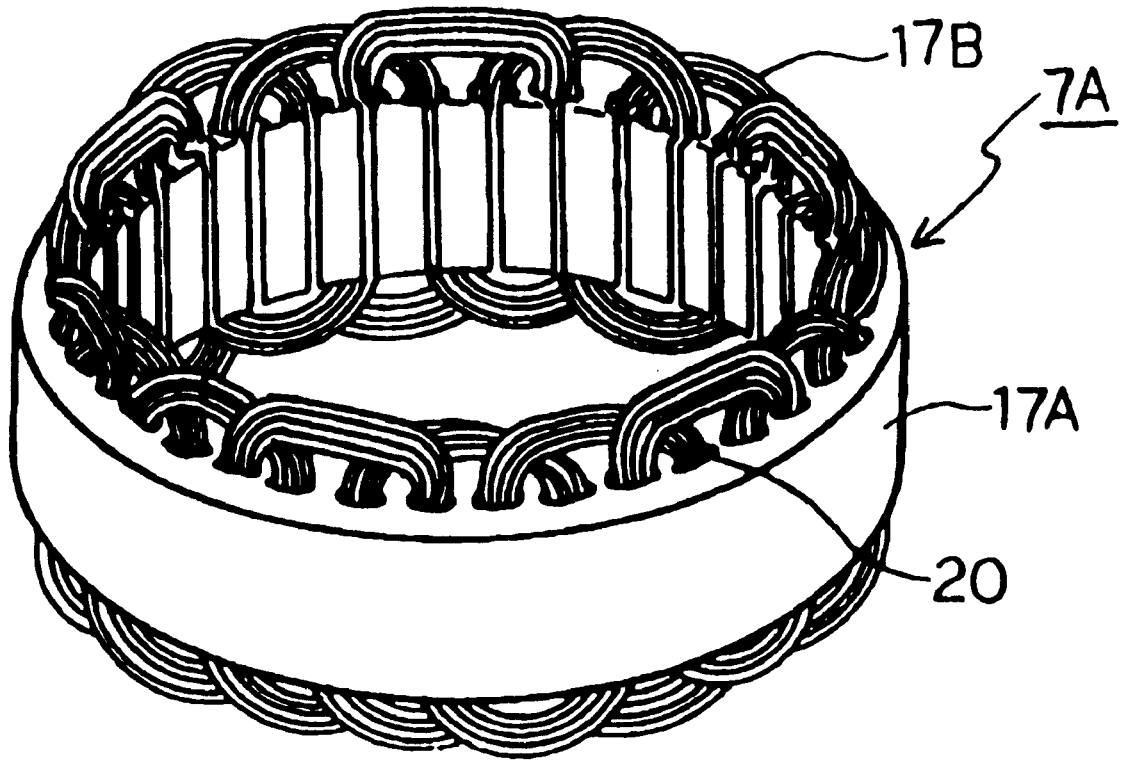
FIG. 18 is a perspective view showing one example of a conventional stator core.
Figure 19:
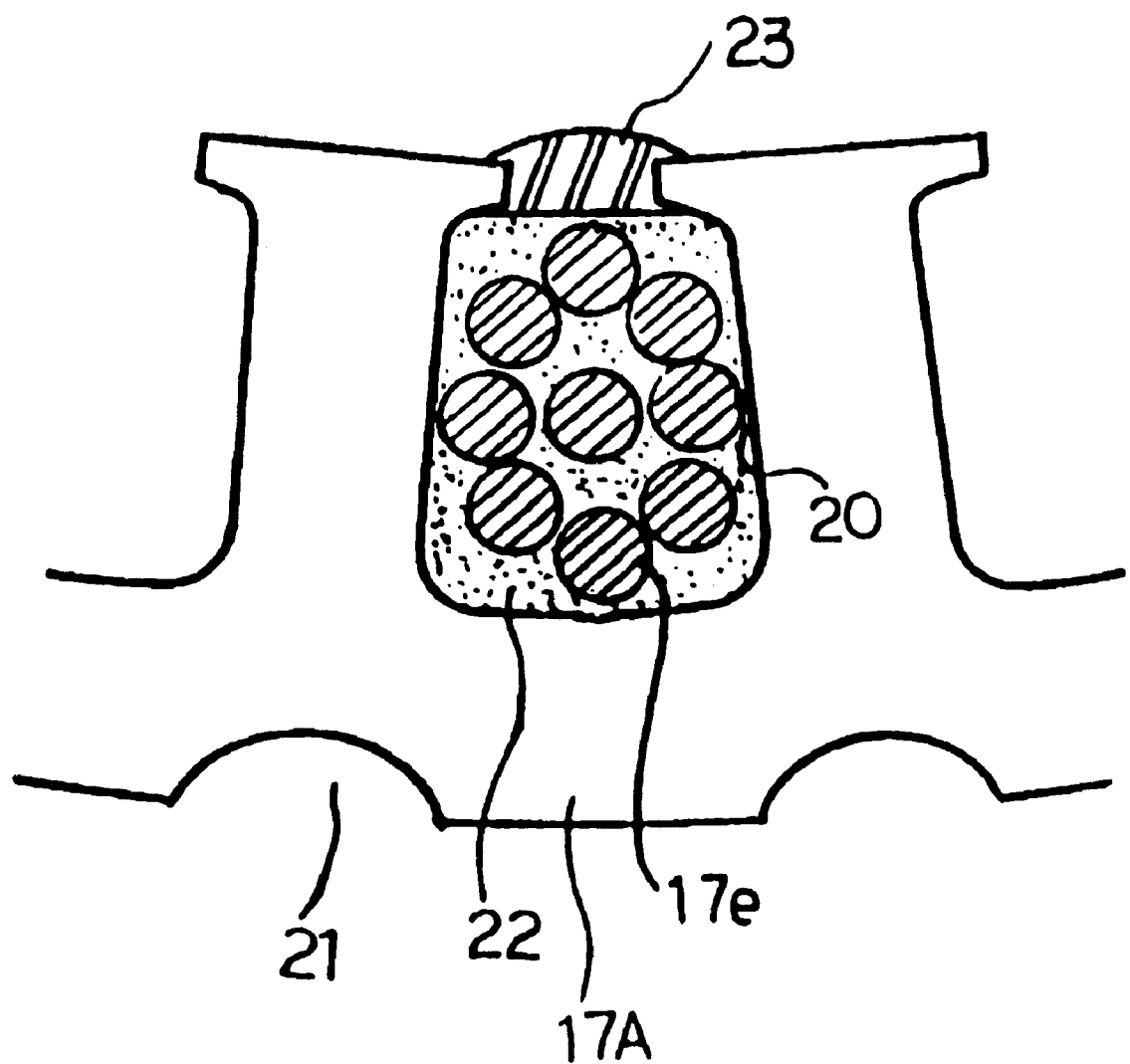
FIG. 19 is a partially sectional view showing the relationship between a coil conductor wire and a slot.
Figure 20:
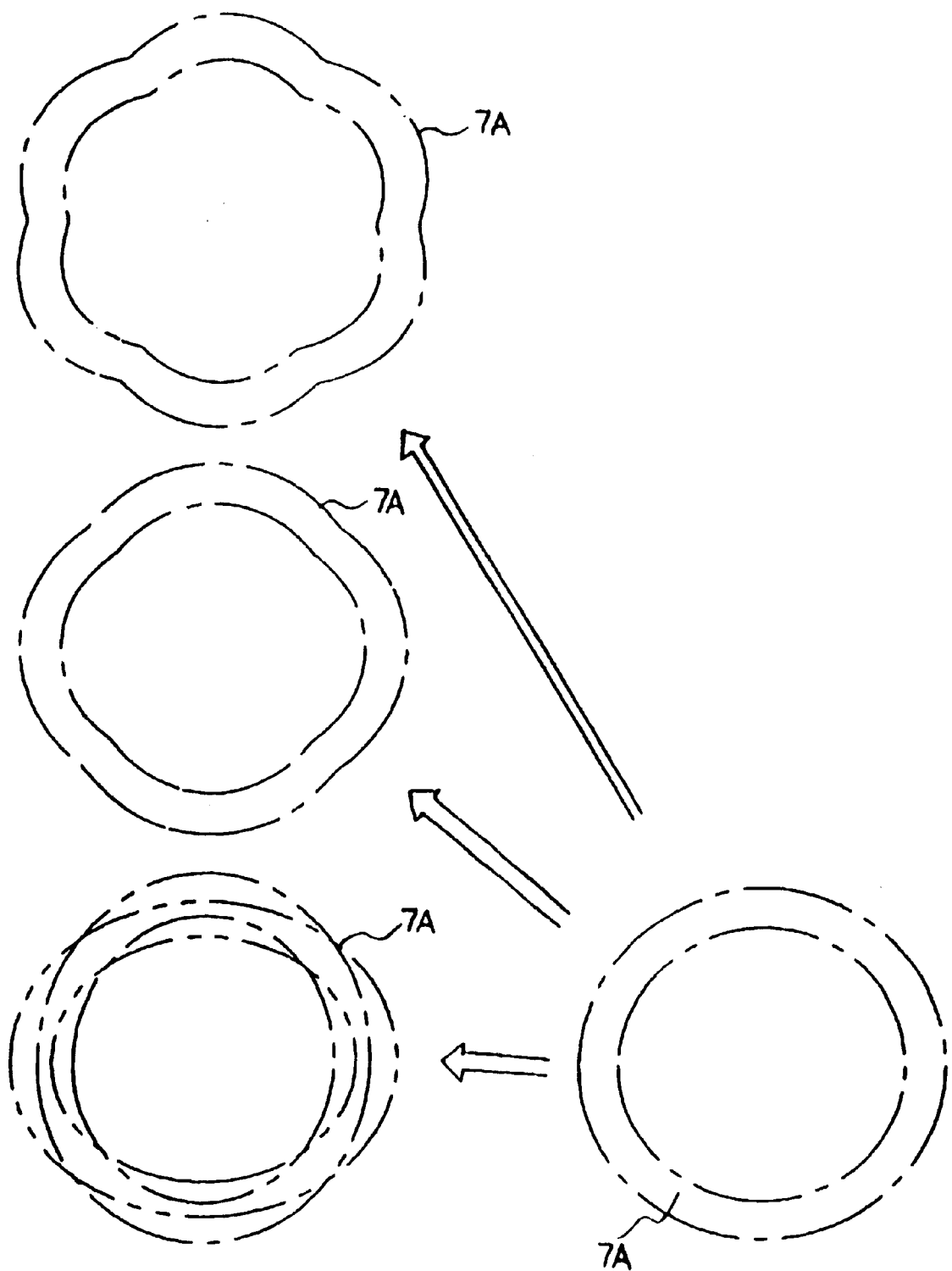
FIG. 20 is a view explaining a conventional problem.
Figure 21:
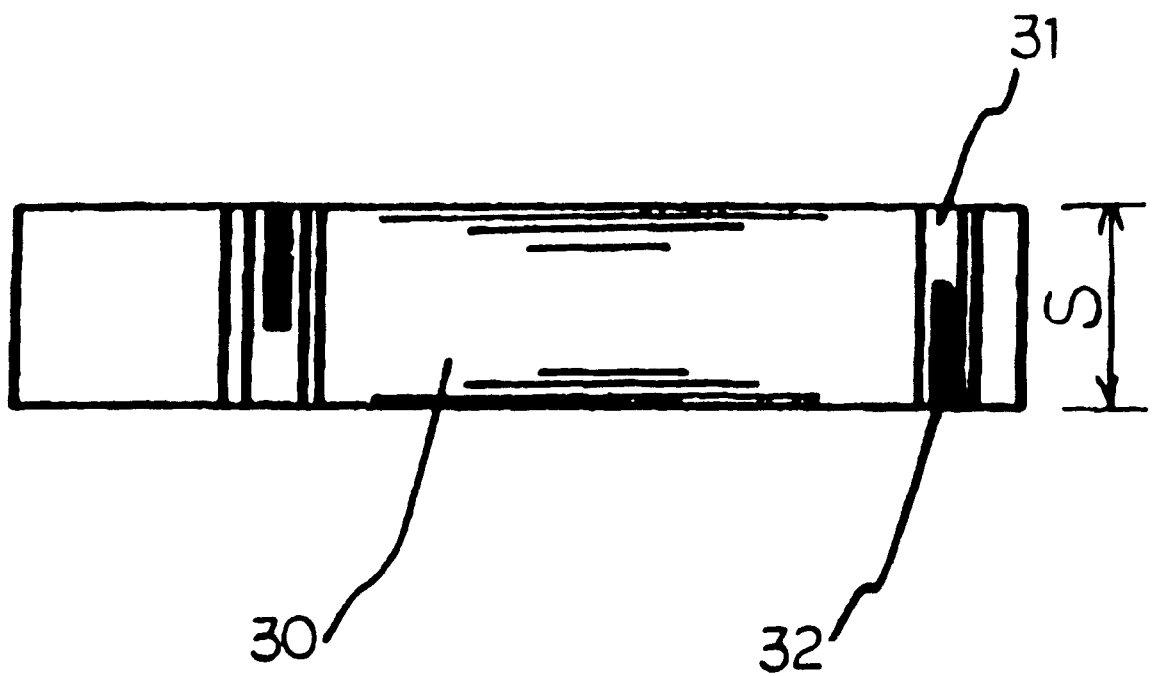
FIG. 21 is a side view showing another example of a conventional stator core.

According to the first embodiment of the present invention, there is provided a stator core that has a (first) circular cylinder body and a (second) circular cylinder body. The first circular cylinder body is formed by laminating a thin metal sheet to have the thickness of 1/N (N is a natural number of more than 2) of a predetermined thickness S (see FIG. 15) in the laminating direction. The second cylinder body is formed by laminating the first circular cylinder body to have the predetermined thickness S and it includes a plurality of core units. This stator core is produced by the steps of first laminating the thin metal sheet to form in advance a plurality of core units (of a circular cylinder shape) with the thickness of 1/N of a predetermined thickness S in the laminating direction, laminating this plurality of core units to form a circular cylinder body with the predetermined thickness S, and securing the core units to one another.

Figure 1:
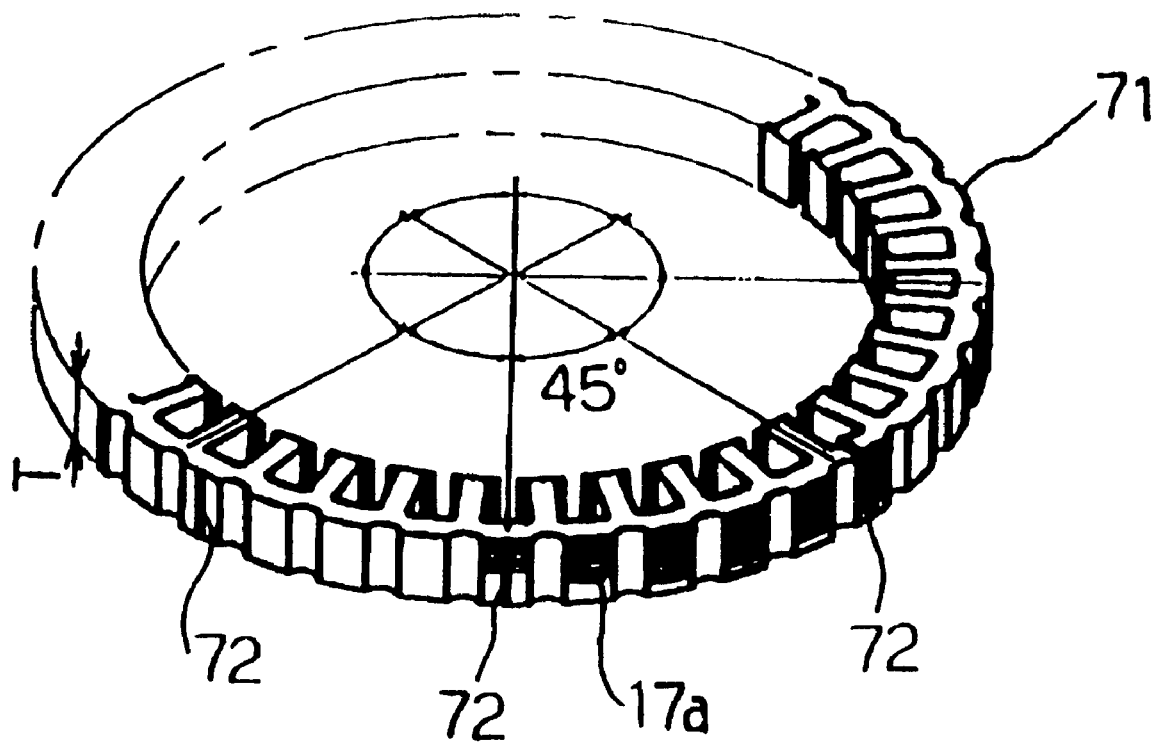
FIG. 1 is a schematic perspective view showing a core unit forming a stator core according to the first embodiment of the present invention.
Figure 2:
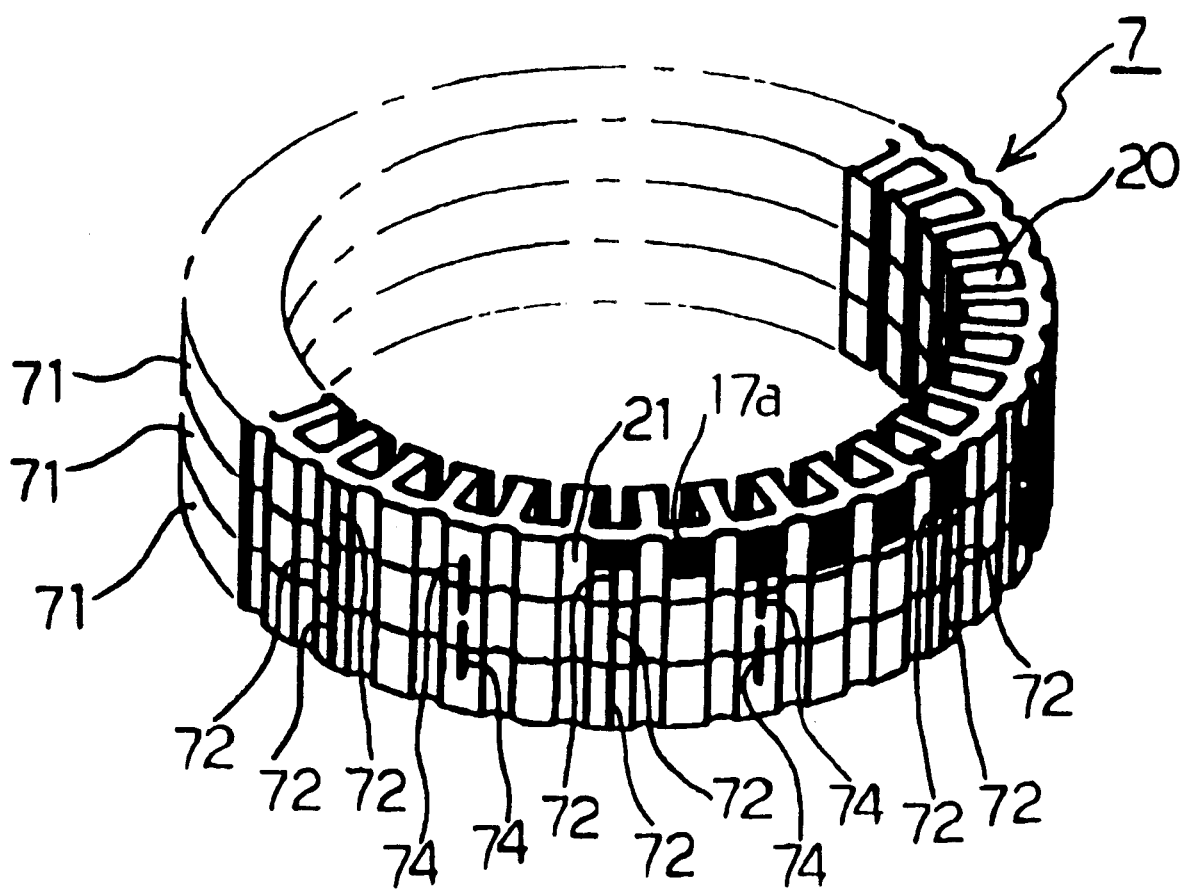
FIG. 2 is a schematic perspective view showing the stator core according to the first embodiment.

FIG. 1 is a view showing a core unit 71. A thin metal sheet 17$a$ is laminated to form a (first) circular cylinder body having the thickness of 1/N, i.e. T (N is a natural number of more than 2) of a predetermined thickness S (see FIG. 15) in the laminating direction. The thin metal sheet 17$a$ is welded at numeral 72 on a plurality of locations on the outer periphery of the (first) circular cylinder body. In FIG. 1, there are shown eight welds 72 on the periphery at intervals of 45° relative to the circular center.

According to the first embodiment of the present invention, there is provided a stator core comprising a plurality of first cylinder bodies each having a predetermined thickness S (see FIG. 15) of 1/N (where N is a natural number greater than 2), of a predetermined axial thickness of the stator core, wherein each first cylinder body is formed by laminating a plurality of thin metal sheets. A second circular cylinder body is formed by laminating the plurality of first cylinder bodies to have the axial predetermined thickness, wherein the pluralities of first cylinder bodies contribute as a plurality of core units in the second cylinder body, and wherein each of the plurality of thin metal sheets is fixedly secured by welding on the outer or inner periphery of the thin metal sheets.

FIG. 1 is a view showing a core unit 71. A first cylinder body is formed by laminating a plurality of thin metal sheets. The cylinder body has a predetermined thickness S (see FIG. 15) of 1/N (where N is a natural number greater than 2) in the laminating direction. The plurality of thin metal sheets are welded at numeral 72 at a plurality of locations on the outer periphery of the cylinder body. In FIG. 1, there are eight welds 72 on the outer periphery at intervals of 45° relative to the circular center.

An electromagnetic sound of a generator having the stator core 7 according to the first embodiment was measured first and then was compared with the sound of a generator having a conventional stator core 7A. As a result, a peak value of unpleasant high frequency order component was reduced and an effect on the reduction of the electromagnetic sound was obtained. Since a characteristic frequency whereby the stator core itself resonantly oscillates is mainly of 30 order components and 36 order components, the effect in these components is shown in FIGS. 3 and 4.

Figure 3:
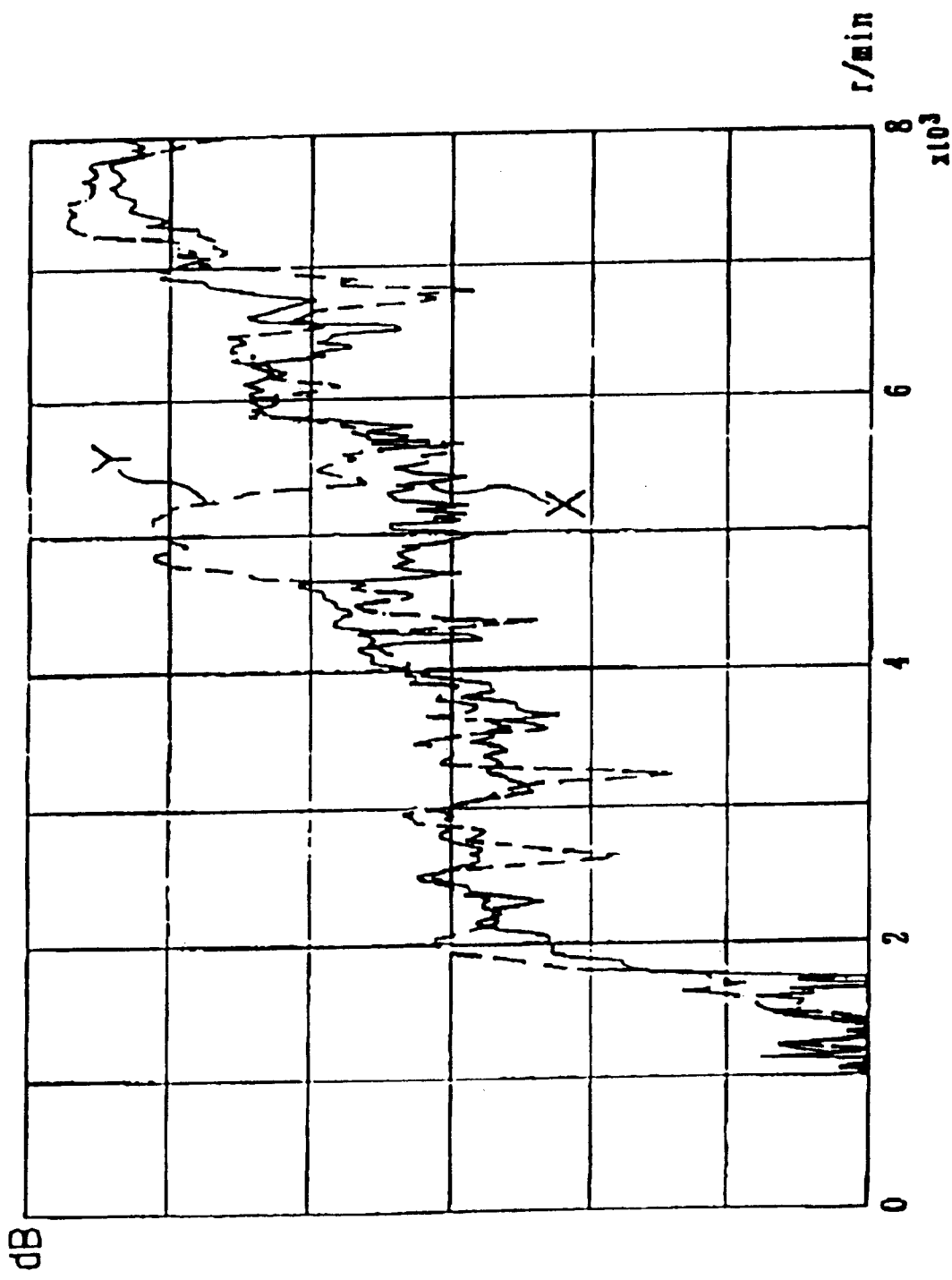
FIG. 3 is a view showing an effect of the stator core according to the first embodiment.

FIG. 3 shows a comparative result of the 30 order components. A solid line X shows the electromagnetic sound level of the 30 order components of a generator provided with the stator core 7 according to the first embodiment, while a broken line Y shows the electromagnetic sound level of the 30 order components of a generator provided with the conventional stator core 17A. According to this comparison, it is found that the electromagnetic sound level (dB) of the 30 order components: $5000(\pm\alpha)\times1/60\times30$ (Hz) when the rotor is especially in the vicinity of 5,000 revolutions is remarkably lower than that of a conventional sound level.

Figure 4:
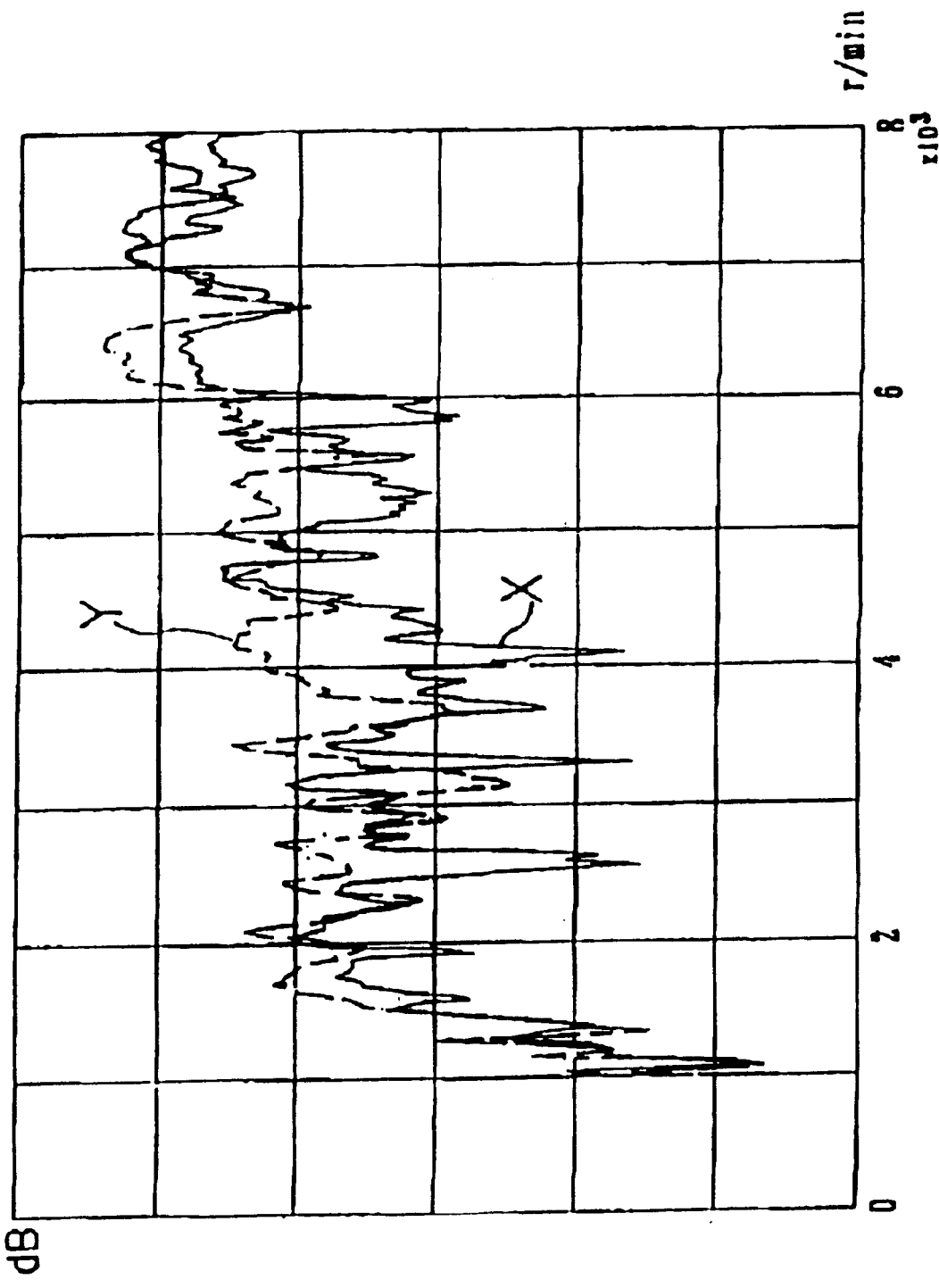
FIG. 4 is a view showing an effect of the stator core according to the first embodiment.

On the other hand, FIG. 4 is a comparative result of the 36 order components, in which a solid line X shows the electromagnetic sound level of the 36 order components of a generator provided with the stator core 7 according to the first embodiment, and a broken line Y shows the electromagnetic sound level of the 36 order components of a generator provided with the conventional stator core 17A. According to this comparison, it is found that the electromagnetic sound level of the 36 order components is generally lower than that of the conventional sound level. It is to be noted that when the rotor is especially in the vicinity of 2,500 revolutions, 3,200 revolutions, and 4,000 revolutions, respectively, the electromagnetic sound level of the 36 order components is remarkably lower than that of the conventional sound level.

Therefore, according to the stator core 7 of the first embodiment, it is to be noted that the stator core 7 makes it difficult to produce an oscillation node in the diametric direction and it can decrease the mode of oscillation.

According to the stator core of the first embodiment, since this is composed of a plurality of core units 71, it is possible to dispersedly arrange the high rigidity portion due to welding at random in both the laminating direction (in the vertical direction in the drawing or in the axial (shaft) direction when attached to the generator) the peripheral direction. The stator core 7 makes it difficult to generate an oscillation node in the diametric direction and can decrease the mode of oscillation as well.

Also, according to a method for producing the stator core of the first embodiment, since it is arranged so that a plurality of core units 71 can be made in advance and then each core unit 71 can be arranged on the outer periphery of the circular cylinder body, welding can be dispersedly made at random in both the laminating and peripheral directions of the circular cylinder body. It is also possible to easily make the stator core 7 with the above-mentioned effect.

$2^{nd}$ Embodiment

Figure 5:
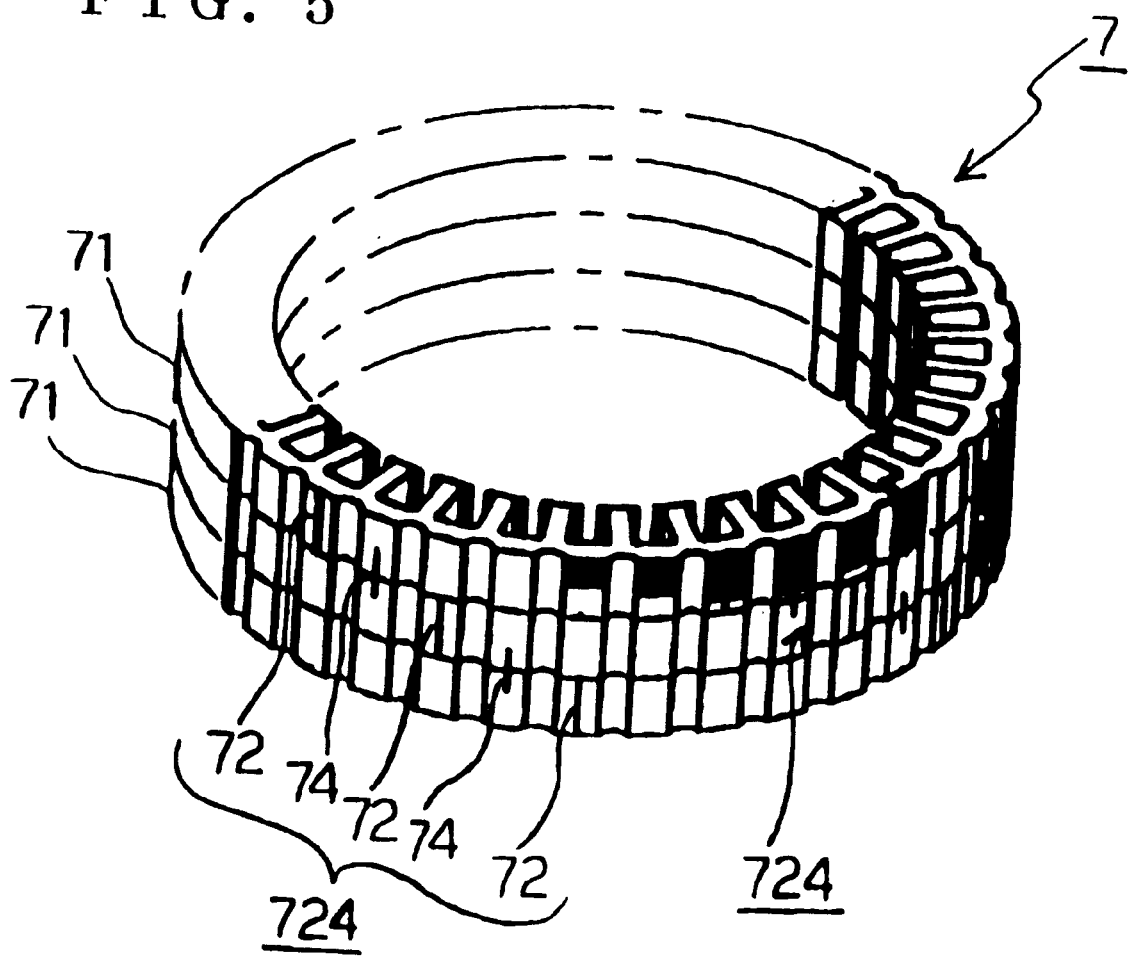
FIG. 5 is a schematic perspective view showing a stator core according to the second embodiment.

In the first embodiment, one example is shown whereby each core unit 71 is laminated first to allow the welding locations 72 of each core unit 71 to correspond with one another and then welds 74 are made to secure each core unit 71. On the contrary, as shown in FIG. 5, each core unit 71 is laminated first to allow the welding locations 72 of each core unit 71 to not correspond with one another in the peripheral direction and welds 74 for securing each core unit 71 may be made between welding locations 72 and 72 which do not correspond with one another in the peripheral direction. When seen as the stator core 7, each welding location is arranged to flow from the upper left to the lower right, and a welding group 724 as arranged in this manner is provided in several places in parallel on the periphery of the circular cylinder body.

Figure 6:
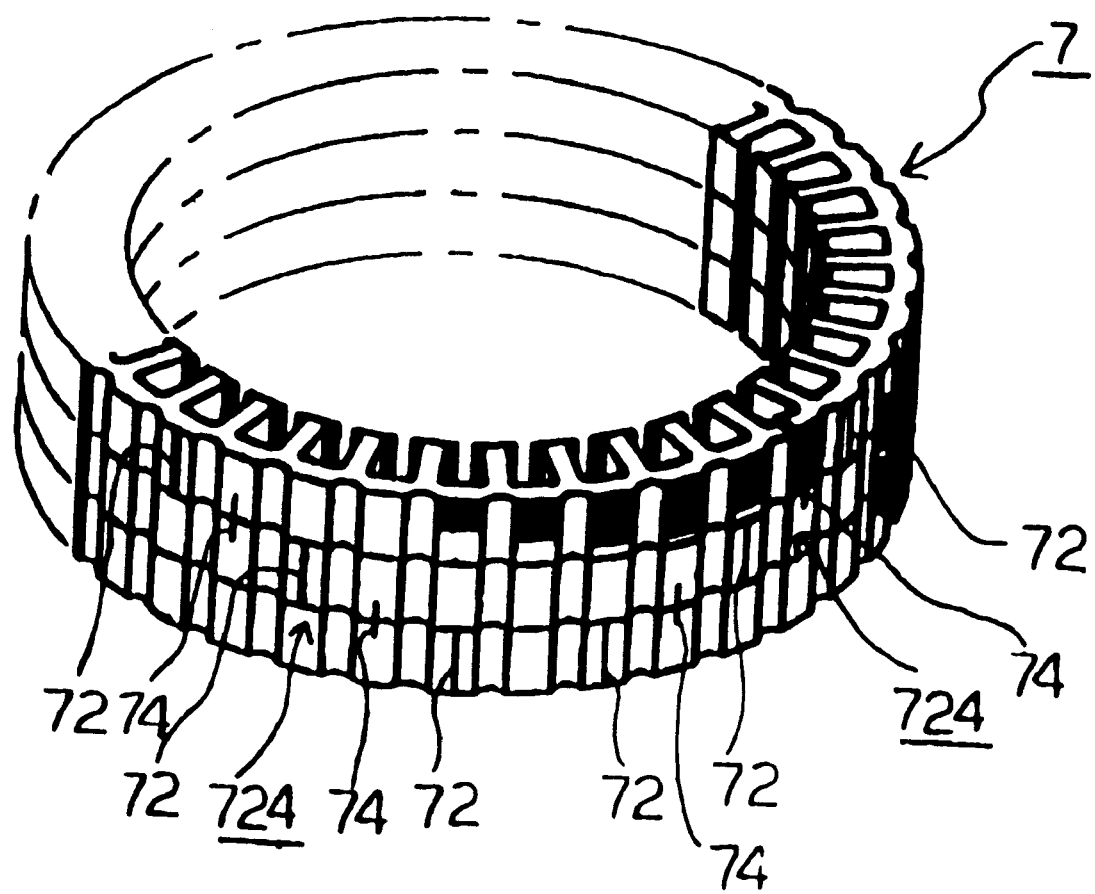
FIG. 6 is a schematic perspective view showing the stator core according to the second embodiment.

Also, as shown in FIG. 6, a welding group 724 may be provided in a zigzag fashion on the periphery of the circular cylinder body. However, a gap between the welds 72 provided on the core unit 71 must be set as shown in FIG. 6.

Even in the second embodiment, since the high rigidity portion due to welding is dispersedly placed at random in both laminating and peripheral directions, it is possible to obtain the stator core 7 having the same effect as the first embodiment and such stator core 7 can also be easily produced.

$3^{rd}$ Embodiment

Figure 7:
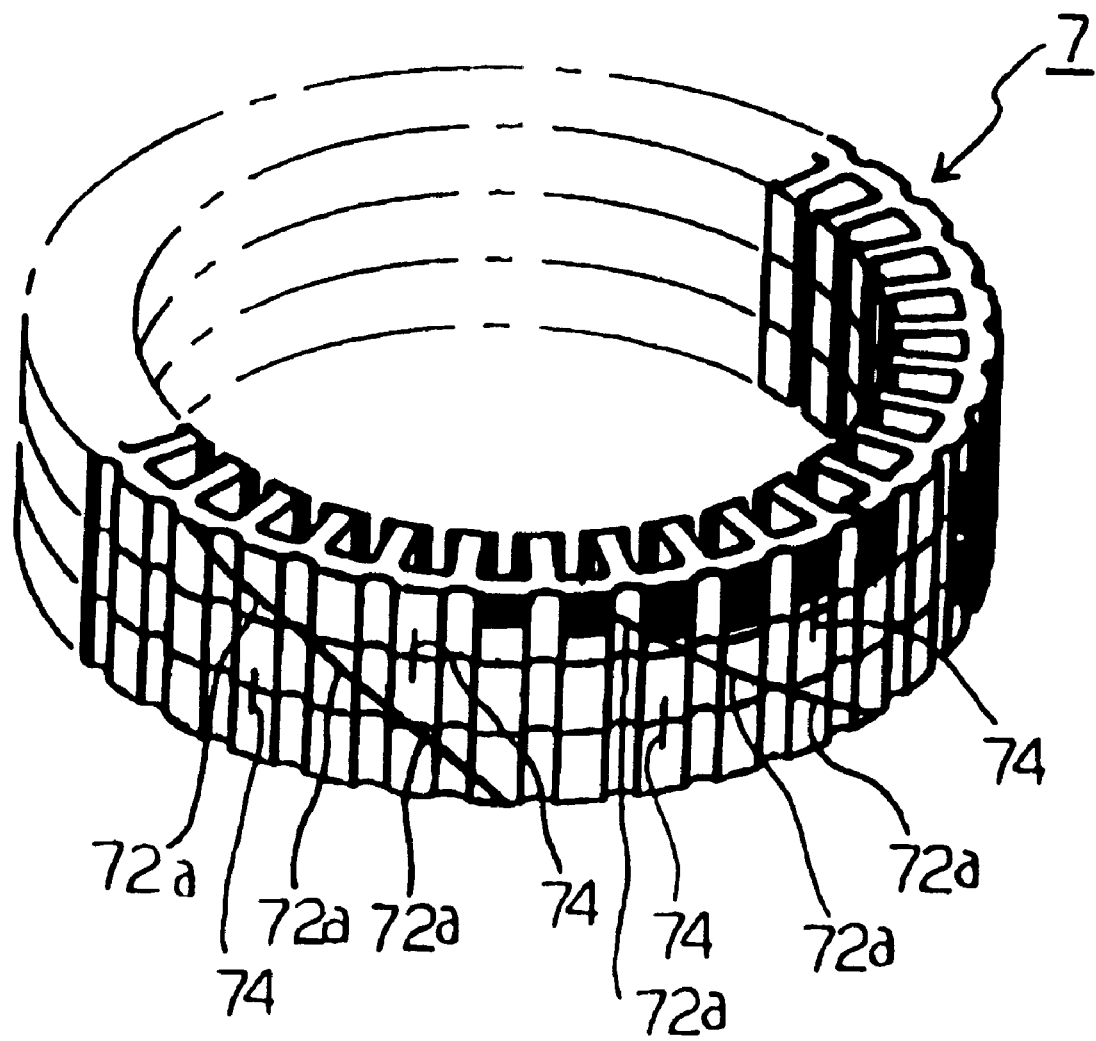
FIG. 7 is a schematic perspective view showing a stator core according to the third embodiment.

In each of the above-mentioned embodiments, it is shown that the welds 72 of each core unit 71 are extended substantially vertically from the top to bottom. However, as shown in FIG. 7, oblique welds 72a are made to secure the thin metal sheets 17a of each core unit 71, and each core unit 71 is laminated first so that one end of the welds 72a of each core unit 71 can contact one another, and then welds 74 may be made at suitable locations to secure each core unit 71.

Also, each core unit 71 may be laminated so that the one ends of the oblique welds 72a of said each core unit 71 do not correspond with one another, and then each core unit 71 may be welded at suitable locations 74.

Even in the third embodiment, since the high rigidity portions due to welding are dispersed at random in both laminating and peripheral directions, it is possible to obtain the stator core 7 having the same effect as the above embodiments 1 and 2, and such stator core 7 can be easily produced.

$4^{th}$ Embodiment

Figure 8:
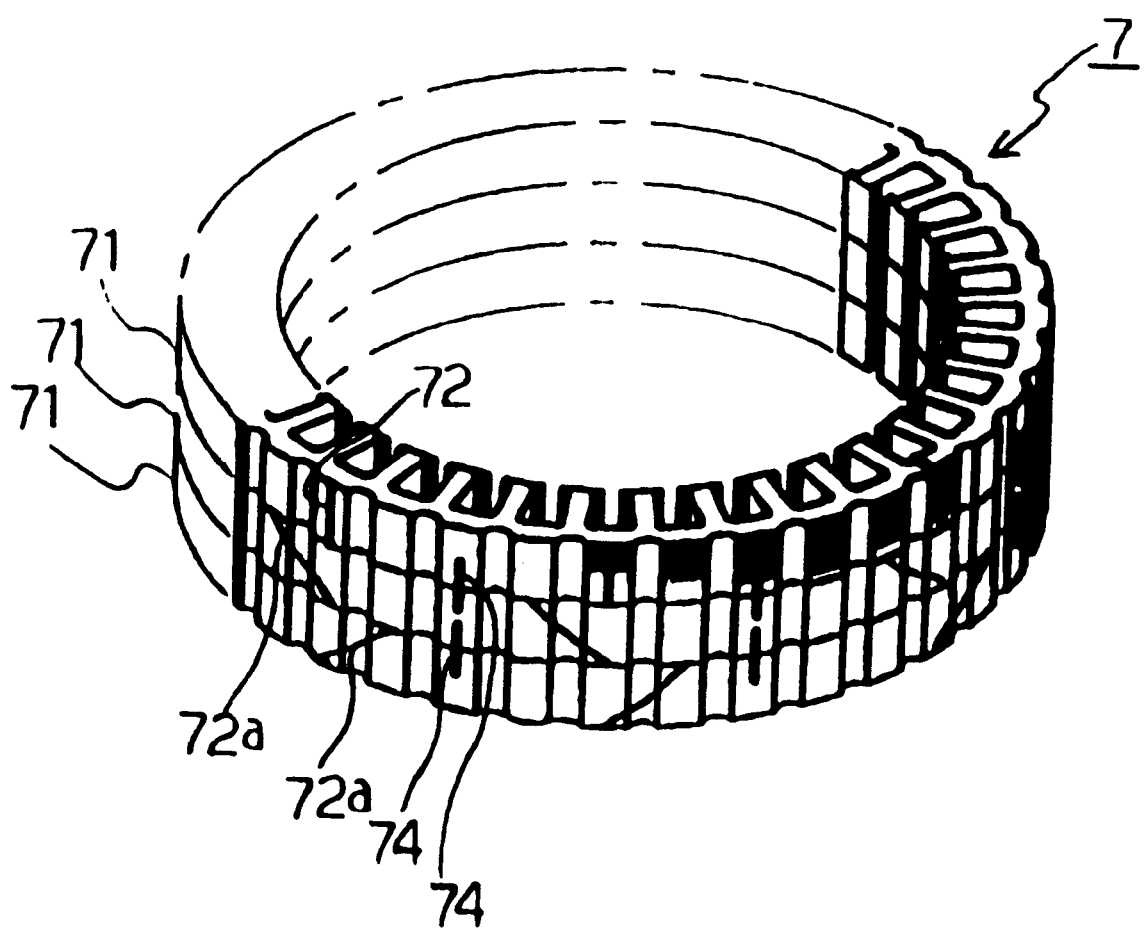
FIG. 8 is a schematic perspective view showing a stator core according to the fourth embodiment.

It is also considered that when each core unit 71 is laminated to not allow the one ends of the welds 72 or 72a to correspond with one another, this is more effective than when each core unit 71 is laminated to allow the one ends of welds 72 or 72a to correspond to one another. In addition to such an arrangement whereby each core unit 71 is laminated to not allow the one ends of the welds 72 or 72a to correspond with one another, there is also another arrangement as shown in FIG. 8. Each core unit 71 is, for example, laminated to not allow the one ends of welds 72 and 72a to correspond with one another, by mixing core unit 71 provided with welds 72 with core unit 71 provided with the oblique welds 72a.

It is to be noted that even in the fourth embodiment, the same effect as the first and second embodiments can be obtained.

5th Embodiment

Figure 9:
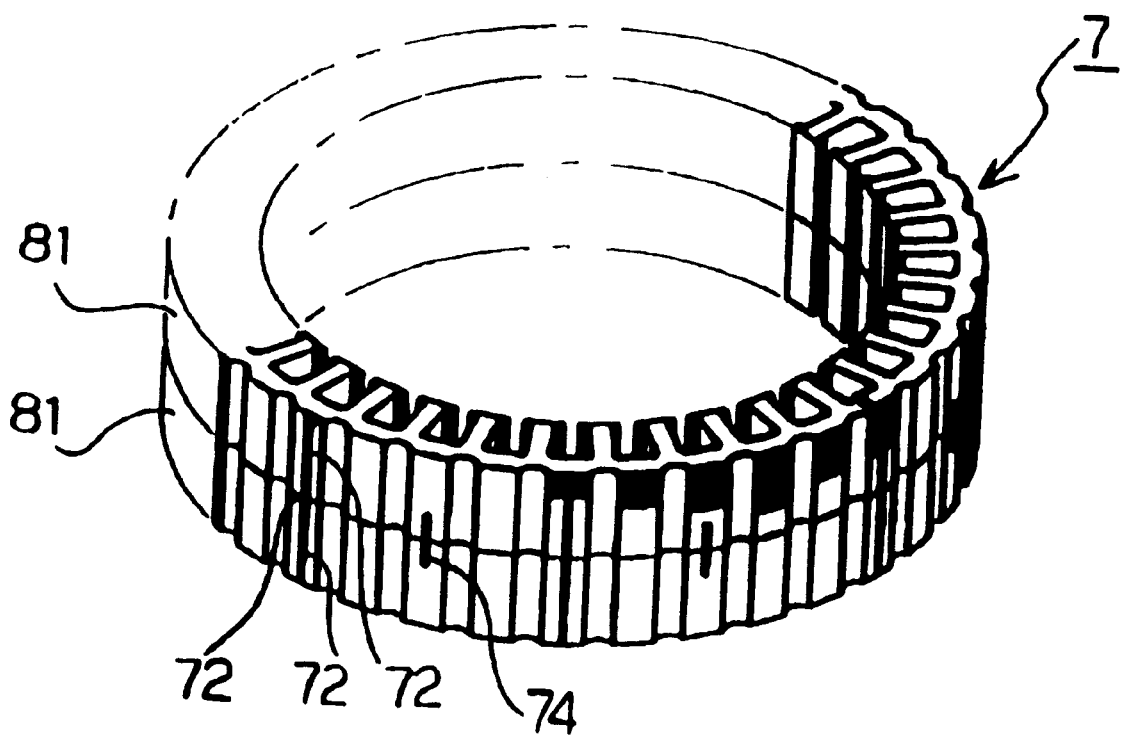
FIG. 9 is a schematic perspective view showing a stator core according to the fifth embodiment.
Figure 10:
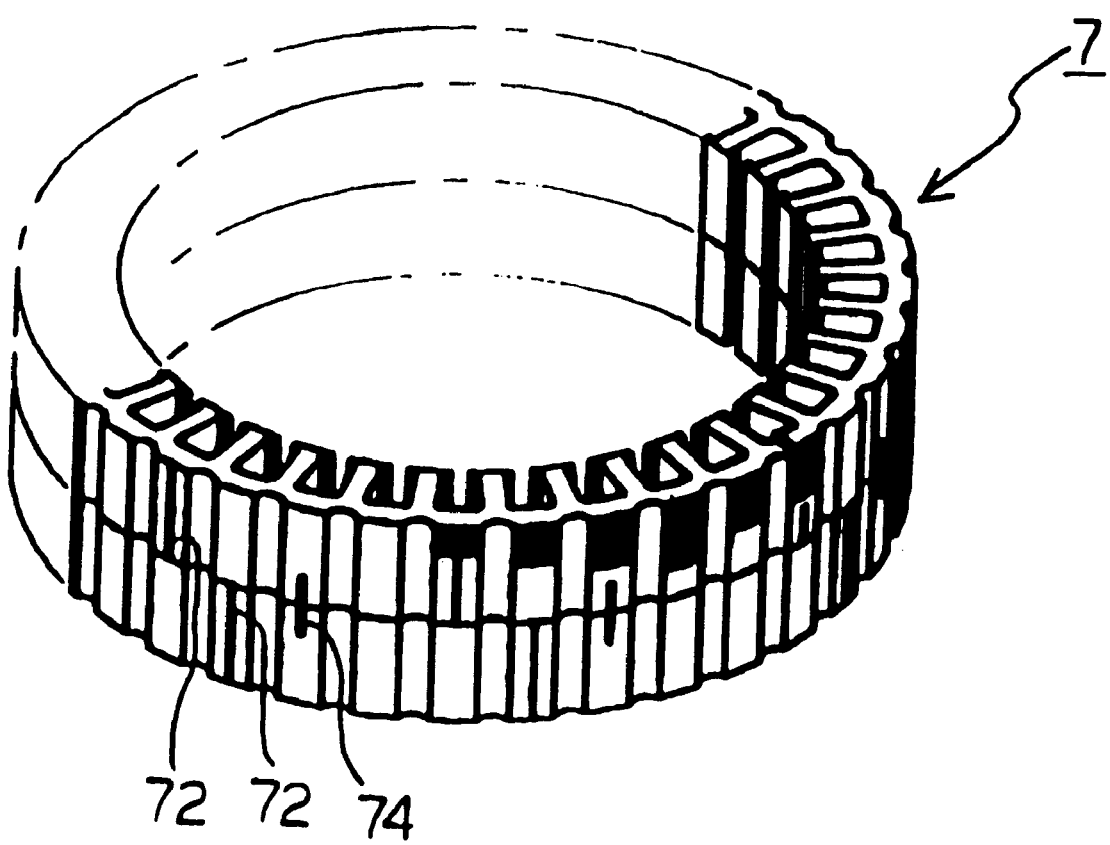
FIG. 10 is a schematic perspective view showing the stator core according to the fifth embodiment.
Figure 11:
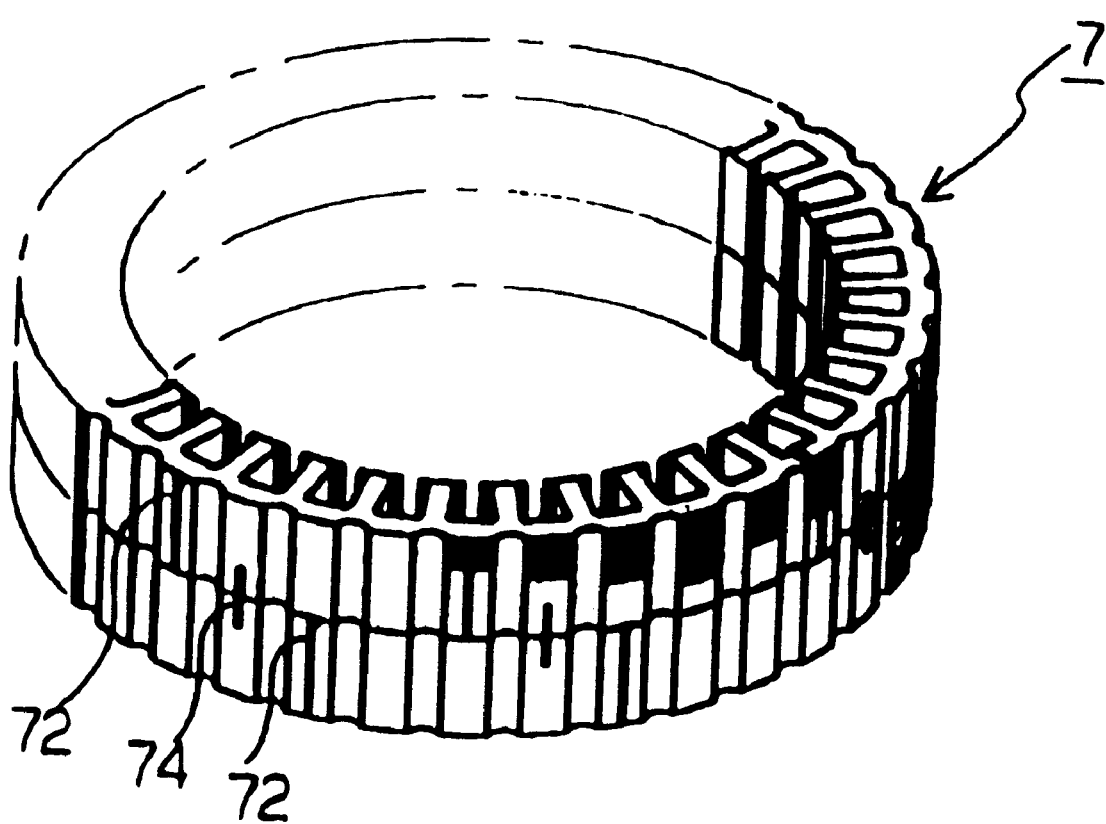
FIG. 11 is a schematic perspective view showing the stator core according to the fifth embodiment, FIG. 12($a$), FIG. 12($b$) are a schematic perspective view showing the sixth embodiment.

In each of the above-mentioned embodiments, there is shown the stator core consisting of three core units 71, but two core units can also be used with the embodiments described above. For example, as shown in FIGS. 9 through 11, the stator core 7 may be composed of two core units 81.

Even in the fifth embodiment, the same effect as the first and second embodiments can be obtained.

6th Embodiment

Figure 12A:
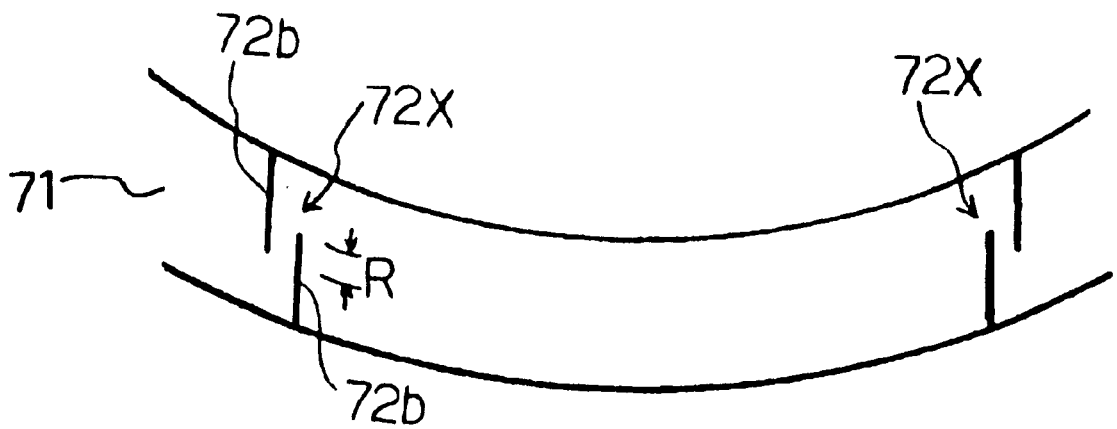
Figure 12B:
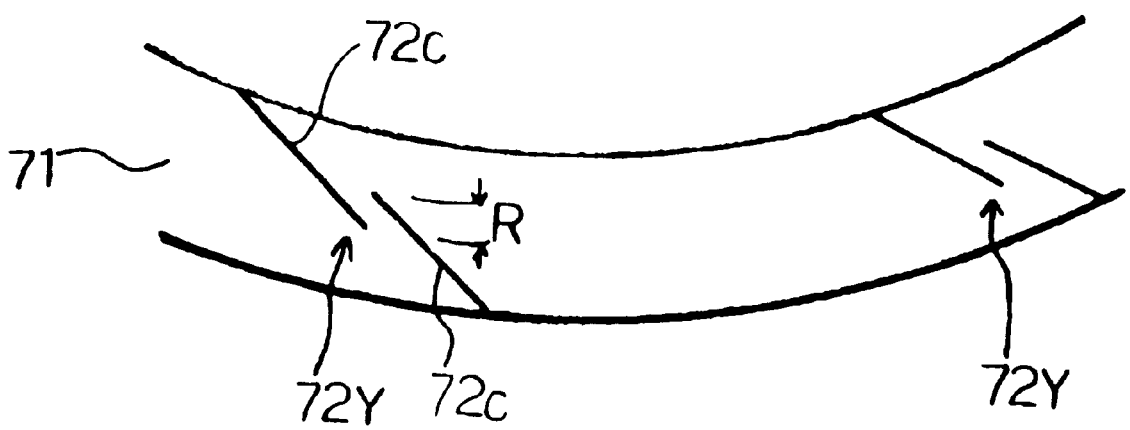
Figure 13:
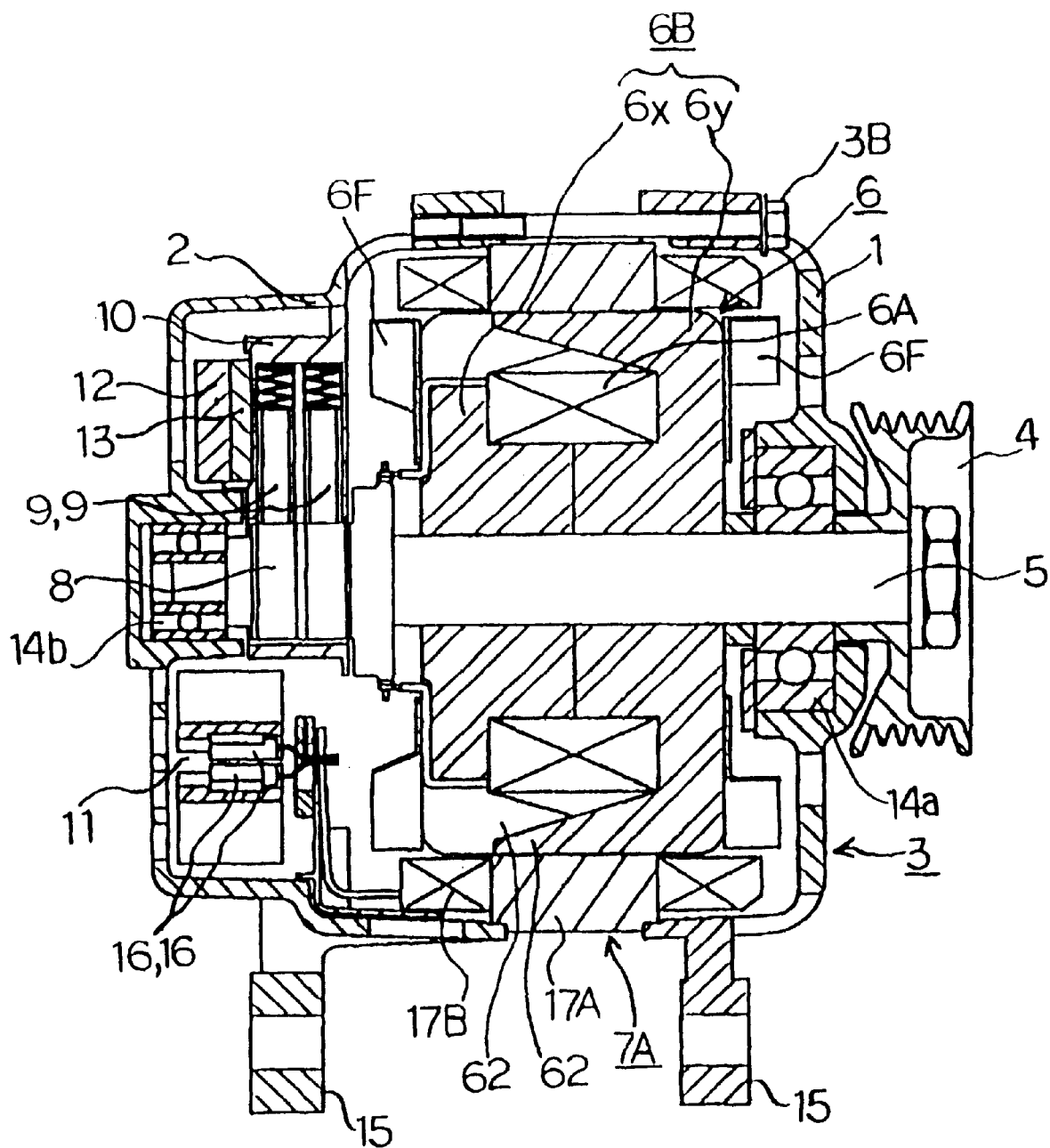
FIG. 13 is sectional view of a conventional vehicle AC generator.
Figure 14:
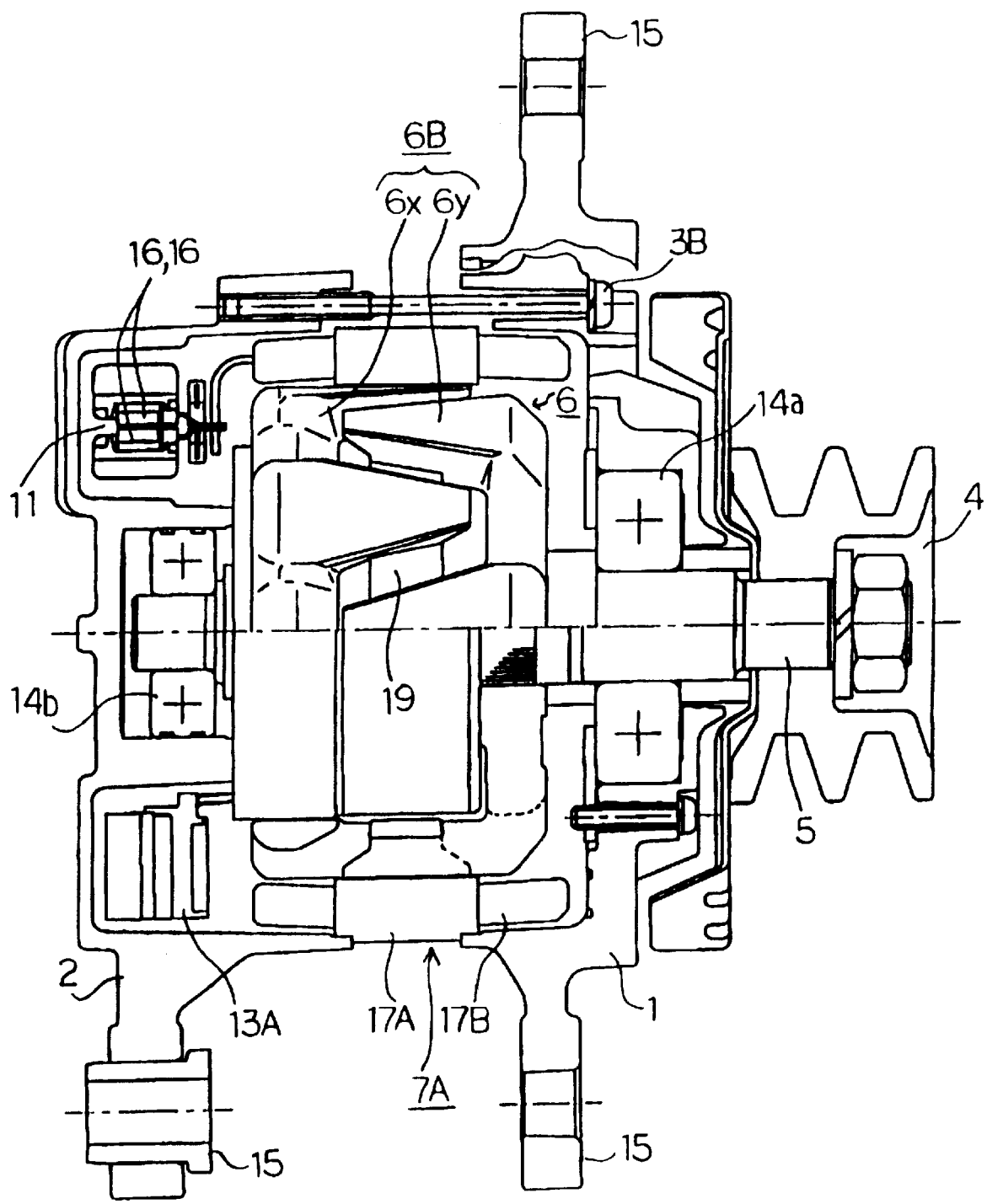
FIG. 14 is a sectional view of a conventional vehicle brushless AC generator.

In each of the above embodiments, the core unit 71 is arranged in such a manner that the thin metal sheets 17a are secured by the welds 72 or the oblique welds 72a to make such welds continuous from the top and bottom in the laminating direction of the thin metal sheets. However, as shown in FIG. 12, the thin metal sheets 17a of each core unit 71 are secured to one another in advance by welds 72X and 72Y that are discontinuous from the top and bottom at several locations on the outer periphery, and each core unit 71 may be laminated to not allow the one ends of the welds 72X and 72Y of each core unit 71 to correspond (or to correspond) with one another. FIG. 12(a) shows an example of vertically discontinuous welds 72X consisting of two substantially vertical welds 72b and 72b, while FIG. 12(b) shows another example of vertically discontinuous welds 72Y consisting of two oblique welds 72c and 72c, wherein the welds 72b and 72b or the oblique welds 72c and 72c are made to produce a wrapping portion R in the laminating direction.

It is to be noted that the same effect as each of the above-described embodiments can be obtained even if each core unit 71 as shown in FIG. 12 is used.

In each embodiment, although the welds have been made on the outer periphery at substantially even intervals, they are not always made at even intervals. The welds may be dispersedly or adjacently made as far as they are united as the stator core. Also, the number of welds on the thin metal sheets of the core unit may not be great if the thin metal sheets do not come off (About 3 to 4 welds are considered reasonable).

Namely, according to the present invention, the object of the invention can be attained if a plurality of core units are used and the welds can be made to allow the high rigidity portions due to welding to disperse in the peripheral and laminating directions. If this is attained, it does not matter how the welding is done.

Accordingly, the stator core may be composed of a core unit of more than four.

Also, welding may be made on the inner periphery of the circular cylinder body.

Further, in each embodiment, although the present invention has been described in its preferred form whereby a long, thin metal sheet 17a is spirally laminated to form a circular cylinder body, it will be apparent that the present invention can also be applied to the case where a plurality of thin metal sheets (of thin plate ring shape) are laminated to form the circular cylinder body.

As described above, according to the present invention, it is possible to provide a stator core that makes it difficult to produce an oscillation node in a diametric direction and can decrease the mode of oscillation as well.

What is claimed is:

1. A method for producing a stator core of an AC generator comprising the steps of:
   (a) forming a plurality of first cylinder bodies, each of said plurality of first cylinder bodies having a predetermined thickness of 1/N (N is a natural number greater than 2), of a predetermined axial thickness of the stator core, wherein each first cylinder body is formed by laminating a plurality of thin metal sheets;
   (b) forming a second circular cylinder body by laminating said plurality of first cylinder bodies to have said axial predetermined thickness, wherein said plurality of first cylinder bodies contribute as a plurality of core units in the second cylinder body, and wherein each of said plurality of thin metal sheets of each of said plurality of first cylinder bodies is fixedly secured by welding on the outer or inner periphery of the first cylinder body; and
   (c) fixedly securing each core unit by welding on the outer or inner periphery of the second cylinder body, wherein a peripheral welding location between two adjacent first cylinder bodies is selected to be different from a welding location of the plurality of thin metal sheets of each of said first cylinder bodies.

2. A method for producing a stator core of an AC generator comprising the steps of:
   (a) forming a plurality of first cylinder bodies, each of said plurality of first cylinder bodies having a predetermined thickness of 1/N (N is a natural number greater than 2), of a predetermined axial thickness of the stator core, wherein each first cylinder body is formed by laminating a plurality of thin metal sheets;
   (b) forming a second circular cylinder body by laminating said plurality of first cylinder bodies to have said axial predetermined thickness, wherein said plurality of first cylinder bodies contribute as a plurality of core units in the second cylinder body, and wherein each of said plurality of thin metal sheets of each of said plurality of first cylinder bodies is fixedly secured by welding on the outer or inner periphery of the first cylinder body; and
   (c) arranging welding locations of the plurality of thin metal sheets of said plurality of first cylinder bodies to be discontinuous in a laminating direction of the thin metal sheets in at least one of the core units.

* * * * *